United States Patent [19]
Gorman et al.

[11] Patent Number: 5,540,400
[45] Date of Patent: Jul. 30, 1996

[54] UNIVERSAL FILM THRUSTING CARTRIDGE AND METHOD

[75] Inventors: Harry A. Gorman, Rochester; Rodney J. Grusetski, Kendall, both of N.Y.

[73] Assignee: Eastman Kodak Company, Rochester, N.Y.

[21] Appl. No.: 386,796

[22] Filed: Feb. 10, 1995

[51] Int. Cl.$^6$ .................................................. G03B 17/26
[52] U.S. Cl. ..................... 242/348; 242/532.1; 242/357; 354/275
[58] Field of Search ................................. 242/348, 348.1, 242/348.2, 348.3, 348.4, 532.1, 582, 357; 354/275

[56] References Cited

U.S. PATENT DOCUMENTS

| | | |
|---|---|---|
| 3,756,528 | 9/1973 | Ohmura .................................. 242/582 |
| 4,173,315 | 11/1979 | Clausser ................................. 242/582 |
| 4,951,893 | 8/1990 | Yuito . |
| 5,015,089 | 5/1991 | Radov . |
| 5,031,852 | 7/1991 | Dowling et al. . |

*Primary Examiner*—John M. Jillions
*Attorney, Agent, or Firm*—C. J. Fildes & Co., P.C.

[57] ABSTRACT

A universal film thrusting cartridge includes a tab connected to a fixed diameter spool core and connectable with a filmstrip of optional length, the tab being sized for use with the shortest filmstrip and trimable to fit longer filmstrips so that when wound within the cartridge the film roll has a prescribed outer diameter at the leading outer end. The trimable tab avoids different core sizes for each filmstrip length in order to obtain the prescribed outer roll diameter needed to match the cartridge wall and allow thrusting of the film out of the cartridge on reverse winding of the spool.

3 Claims, 1 Drawing Sheet

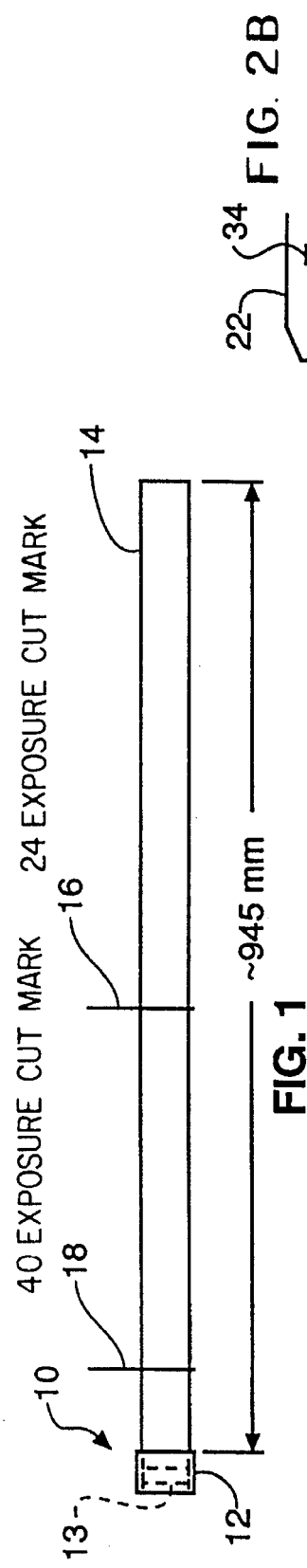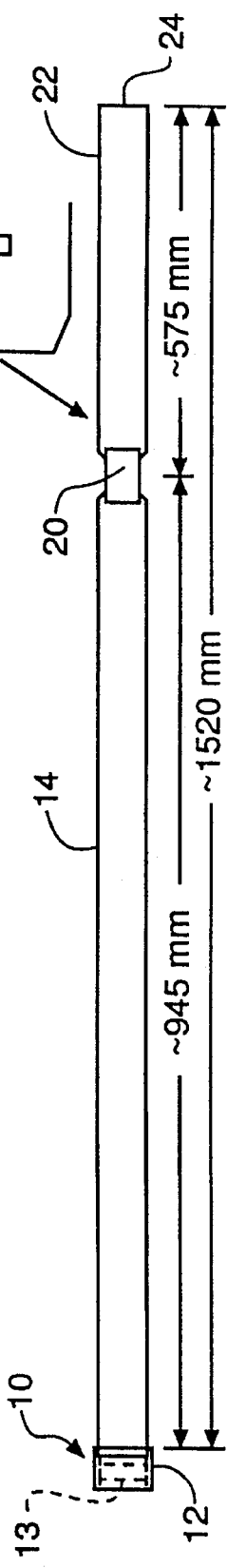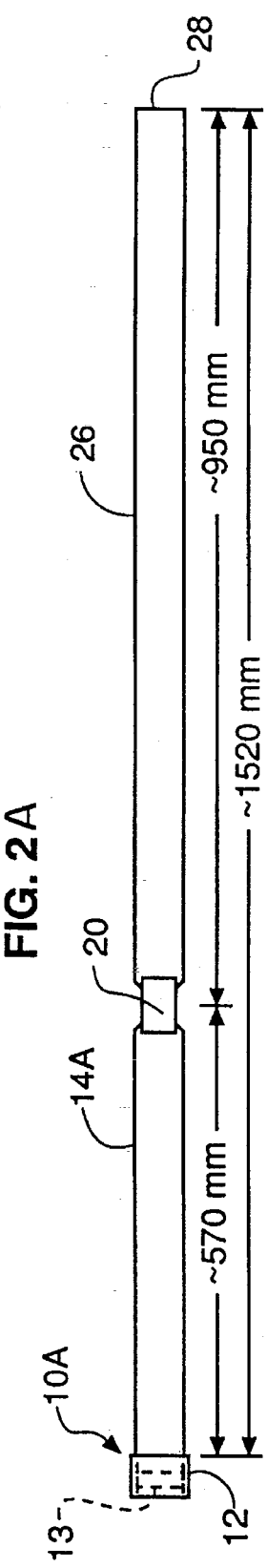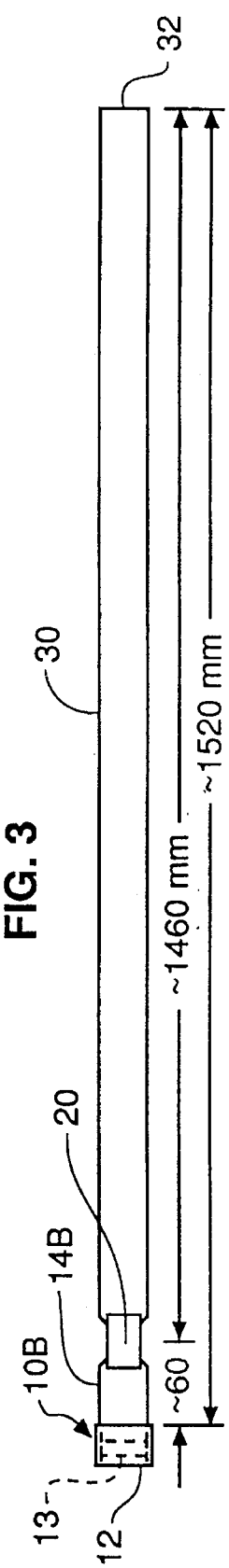

UNIVERSAL FILM THRUSTING CARTRIDGE AND METHOD

FIELD OF THE INVENTION

This invention relates to film thrusting cartridges for cameras and the like wherein a photographic filmstrip contained on a spool within the cartridge has an outer end or leader which may be thrust out of the cartridge by reverse rotation of the spool within the cartridge.

BACKGROUND OF THE INVENTION

In a photographic film thrusting cartridge system wherein photographic film wound on a spool within the cartridge may have an outer end that is thrust outward by reverse rotation of the spool, it is necessary or at least desirable, that the fully wound film roll maintain a predetermined minimum distance between the outer diameter of the film roll at its outer end and the adjacent inner wall of the cartridge. In order to accomplish this where a common size cartridge is used to contain filmstrips of varying sizes such as 12 exposure, 24 exposure, and 40 exposure lengths, it is possible to compensate for the varying filmstrip sizes by varying the core diameter of the associated film spool. Thus a 12 exposure filmstrip might be wound on a 12 mm spool core while a 40 exposure strip would require a spool core of only 7 mm diameter.

A problem with this proposal is that three different spool diameters are required to accommodate the three common variations of filmstrip length. This problem extends not only to the initial manufacture of film cartridges but also to so called "trouble roll" cartridges required by film processors for use as replacement cartridges in cases where a film cartridge provided by the customer is found to be defective. The differing spool core diameters used for the different filmstrips would require that the film processors have cartridges with all three spool sizes in stock for use with trouble rolls and this would increase the cost of manufacturing and storing the spare cartridges required.

SUMMARY OF THE INVENTION

The present invention provides a solution to this problem by providing for the use of a single size cartridge constructed using the smallest diameter spool core (such as 7 mm) required for carrying the largest available filmstrip length. The spool is connected to a tab in the form of a trailer filmstrip of any suitable material, such as base or leader material, having a length sufficient that, upon attachment of the shortest available filmstrip thereto and winding of the tab and filmstrip into the container, the outer end of the filmstrip will be positioned at a prescribed outer diameter that is within the required minimum distance of the film surface from the cartridge inner wall. For use with longer filmstrips, the unneeded length of the tab may be cut off, preferably at indicating marks or indicia provided in advance on the tab, so that the combined length of the filmstrip and the remaining portion of the tab will always be such that the wound film will have the prescribed outer diameter giving the desired dimensional space between it and the cartridge housing. Thus a single size film cartridge with film spool and associated tab may be used to accommodate all available sizes of filmstrips, both in the manufacture of new film cartridges and for trouble roll cartridge purposes.

These and other features and advantages of the invention will be more fully understood from the following detailed description of the invention taken together with the accompanying drawings.

BRIEF DESCRIPTION OF THE DRAWINGS

In the drawings:

FIG. 1 is a schematic plan view of a thrusting film cartridge together with an associated tab according to the invention shown in its extended position;

FIG. 2 is a view similar to FIG. 1 but showing, in addition, a conventional 12 exposure filmstrip taped to the end of the tab prior to rolling within the cartridge;

FIG. 2A is an enlarged view of the attached end of the filmstrip showing the perforated form of the film;

FIG. 3 is a view similar to FIG. 2 but showing the attachment of a 24 exposure filmstrip; and FIG. 4 is a view similar to FIGS. 2 and 3 but showing the attachment of a 40 exposure filmstrip.

DETAILED DESCRIPTION OF THE INVENTION

Referring now to the drawings in detail, numeral 10 generally indicates a cartridge having a housing 12 including a conventional film spool with a small 7 mm diameter core 13, the spool and core 13 being indicated by dashed lines. Connected with the spool and extending outwardly beyond the housing 12 is a tab 14 formed by a length of any suitable leader type material, preferably not including perforations. Tab 14 has a length of about 945 mm and contains indicia 16, 18, respectively, indicating cut points for trimming the tab to shorter lengths as will be subsequently more fully discussed. Tab 14 is shown fully extended and may be attached to the core 13 by tape or any known method.

FIG. 2 illustrates the cartridge 10 including the housing 12 and tab 14 of FIG. 1 to which there has been spliced, or attached by tape 20, a conventional 12 exposure filmstrip 22 having a length of approximately 575 mm. With the tab length of about 945 mm, the total length for the tab and filmstrip is about 1,520 mm. The length and thickness of the tab 14 and filmstrip 22 are such that, when their combined lengths are rolled onto the roll not shown within the cartridge 10, the outer end 24 of the filmstrip will be positioned within the cartridge at a prescribed diameter that gives a predetermined minimum distance from the interior of the housing outer wall. This is required in order for the cartridge to operate properly as a film thrusting cartridge capable of thrusting the outer end 24 of the filmstrip out of the cartridge upon reverse rotation of the spool 13 by suitable means.

A prior form of film thrusting cartridge capable of operation in the manner described is illustrated in U.S. Pat. No. 5,031,852 issued Jul. 16, 1991 to the assignee of the present invention. Various other patents disclosing film thrusting cartridges (referred to as cassettes) are also discussed in this patent. If desired, the leading outer end 24 of the filmstrip 22 may be formed as part of a leader, not intended for exposure in an associated camera.

FIG. 3 illustrates an alternative embodiment of cartridge 10A having a housing 12 and in which the tab 14A has been shortened by trimming at the point indicated by indicia 16 of FIG. 1 for attachment by tape 20 to a 24 exposure filmstrip 26 having an outer end 28. Note that the filmstrip 26 has a length of approximately 950 mm and the trimmed tab has a length of approximately 570 mm giving a total of about 1,520 mm as in the embodiment of FIG. 2.

FIG. 4 illustrates a third embodiment of cartridge 10B having a housing 12 in which the tab 14B has been further shortened by trimming at the point marked by indicia 18 of FIG. 1 for attachment by tape 20 to a 40 exposure filmstrip 30 having an outer end 32. In this case, the length of the 40 exposure filmstrip of about 1,460 mm added to the approximate 60 mm length of the trimmed tab 14B again equals about 1,520 mm for the total length as in the other two embodiments.

The thicknesses of the film making up the tabs 14, 14A, 14B, are essentially the same as those making up the filmstrips 22, 26, 30 and the overall lengths of the three embodiments are the same. Thus, it is apparent that when all three of the filmstrip-tab combinations are wound into their respective cassette housings 12 on their identical spools not shown, the outer ends 24, 28, 32 of the filmstrips will be positioned at essentially the same diameter measurements, giving identical distances from the adjacent outer wall of the housing 12. They will thereby be enabled to function in the usual manner for allowing thrusting of the film out of the cassette when required for use in a camera or in subsequent processing operations of the exposed film.

FIG. 2A is included to illustrate that the filmstrips 20, 26, 30 are generally made with accompanying perforations 34 for advancing the film or indicating the position of the film in conventional manner by mechanisms or sensors within a camera or associated with exposed film processing equipment. Accordingly, the tabs 14, 14A, 14B are preferably unperforated so that automatic equipment can easily distinguish between the active filmstrips and the uncoated trailer tabs.

The illustrated embodiments disclose the basic concept of providing a cartridge with a spool of a single (small) core size for use with various lengths of filmstrips by interposing a trailer tab which may be trimmed to match any of selected filmstrip lengths to obtain a desired roll diameter when the tab and film are wound onto the spool. Additional features are also disclosed.

Although the invention has been described by reference to selected specific embodiments, it should be understood that numerous changes may be made within the spirit and scope of the inventive concepts described. Accordingly, it is intended that the invention not be limited to the described embodiments, but that it have the full scope defined by the language of the following claims.

Parts List

| | | | |
|---|---|---|---|
| 10. | cartridge | 18. | indicia |
| 10A. | cartridge | 20. | tape |
| 10B. | cartridge | 22. | filmstrip (12) |
| 12. | housing | 24. | outer end |
| 13. | core | 26. | filmstrip (24) |
| 14. | tab | 28. | outer end |
| 14A. | tab | 30. | filmstrip (40) |

-continued

Parts List

| | | | |
|---|---|---|---|
| 14B. | tab | 32. | outer end |
| 16. | indicia | 34. | perforations |

What is claimed is:

1. A film thrusting cartridge wherein a film spool has a core capable of having wound thereon a filmstrip of selected length for exposure or processing and enclosing the entire wound filmstrip within the cartridge, said filmstrip having a leading outer end that, when received in the cartridge, is maintained at a prescribed diameter that is within a predetermined distance from an inner surface of the cartridge for thrusting of said outer end out of the cartridge upon reverse rotation of the film spool, said cartridge characterized by:

said core having a fixed diameter; and a tab connected with the core and connectable with such filmstrip for connecting the core with the filmstrip, said tab having a length that when connected with said selected length of filmstrip wound into the cartridge will position said leading outer end at said prescribed diameter to assure proper thrusting operation of the film from the cartridge, said tab being initially formed with a length that, when connected with the shortest available length of filmstrip, will position said leading outer end within said predetermined distance, said tab being trimable to appropriately shorter lengths for connection with available longer filmstrips, and said tab including spaced indicia to indicate trim points for matching the length of tab with filmstrips of various available lengths.

2. A method of making a thrusting film cartridge for use with filmstrips of varying selected lengths and wherein a leading outer end of each filmstrip when wound into the cartridge maintains a prescribed diameter what is within a predetermined minimum distance from an outer guide surface of the cartridge for maintaining proper thrusting operation of the film from the cartridge, said method characterized by:

providing a film winding spool in the cartridge having a core of fixed diameter; and attaching to the core a tab for connection with a filmstrip, said tab having a length adequate for connection with the shortest selected length of such filmstrip that when connected with such selected length of filmstrip wound into the cartridge maintains said prescribed diameter; and trimming the tab as required prior to connection with a filmstrip having a length greater than said shortest length.

3. A method as in claim 2 further characterized by:

providing indicia on said tab to indicate trimming points for use of the tab with various lengths of filmstrips.

* * * * *